United States Patent [19]

Ishiguro et al.

[11] Patent Number: 5,302,887
[45] Date of Patent: Apr. 12, 1994

[54] CHARGING APPARATUS

[75] Inventors: Kazutoshi Ishiguro; Makoto Nojima, both of Tottori, Japan

[73] Assignee: Sanyo Electric Co., Ltd., Moriguchi, Japan

[21] Appl. No.: 85,130

[22] Filed: Jun. 29, 1993

Related U.S. Application Data

[63] Continuation of Ser. No. 751,320, Aug. 28, 1991, abandoned.

[30] Foreign Application Priority Data

| Dec. 1, 1990 | [JP] | Japan | 2-400070 |
| Dec. 1, 1990 | [JP] | Japan | 2-400073 |
| Dec. 6, 1990 | [JP] | Japan | 2-400600 |
| Jun. 26, 1991 | [JP] | Japan | 3-154821 |

[51] Int. Cl.$^5$ ............................................. H02J 7/04
[52] U.S. Cl. ................................. 320/32; 320/20; 320/21
[58] Field of Search ............ 320/20, 21, 32, 31, 320/37, 38, 39, 40

[56] References Cited

U.S. PATENT DOCUMENTS

| 3,794,905 | 2/1974 | Long | 320/20 |
| 4,213,081 | 7/1980 | Taylor | 320/40 |
| 4,354,148 | 10/1982 | Tada et al. | 320/20 |
| 4,387,332 | 6/1983 | Oyamada et al. | 320/15 |
| 4,388,582 | 6/1983 | Saar et al. | 320/20 |
| 4,418,310 | 11/1983 | Bollinger | 320/39 |
| 4,668,901 | 5/1987 | Furukawa | 320/31 |
| 4,742,290 | 5/1988 | Sutphin et al. | 320/21 |
| 4,849,682 | 7/1989 | Bauer et al. | 320/15 |
| 4,855,663 | 7/1989 | Matsui et al. | 320/20 |

FOREIGN PATENT DOCUMENTS

| 596731 | 1/1964 | Japan . |
| 59-56831 | 4/1984 | Japan . |
| 59-178929 | 10/1984 | Japan . |
| 59-194640 | 11/1984 | Japan . |
| 60-2858 | 1/1985 | Japan . |
| 61-26437 | 2/1986 | Japan . |
| 1097451 | 1/1968 | United Kingdom . |

OTHER PUBLICATIONS

Matsumoto et al., Sanyo Technical Review, 23, 118-125 (1991).

Primary Examiner—Steven L. Stephan
Assistant Examiner—Adolf Berhane
Attorney, Agent, or Firm—Hoffmann & Baron

[57] ABSTRACT

A charging apparatus includes a microcomputer which turns a transistor on so as to supply a charging current from a constant current source to a battery pack incorporating a secondary battery. The microcomputer counts a time required for increasing a battery voltage of the secondary battery, which is outputted from an A/D converter, by a predetermined value, and predicts a time during when the battery voltage will be subsequently increased by the predetermined value. If the battery voltage is not increased by the predetermined value within a predicted time, the microcomputer determines that the battery voltage reaches a peak value thereof and turns the transistor off to terminate a charge. The charging apparatus is suitable for a rapid charge of Ni-MH batteries.

17 Claims, 8 Drawing Sheets

F I G. 3
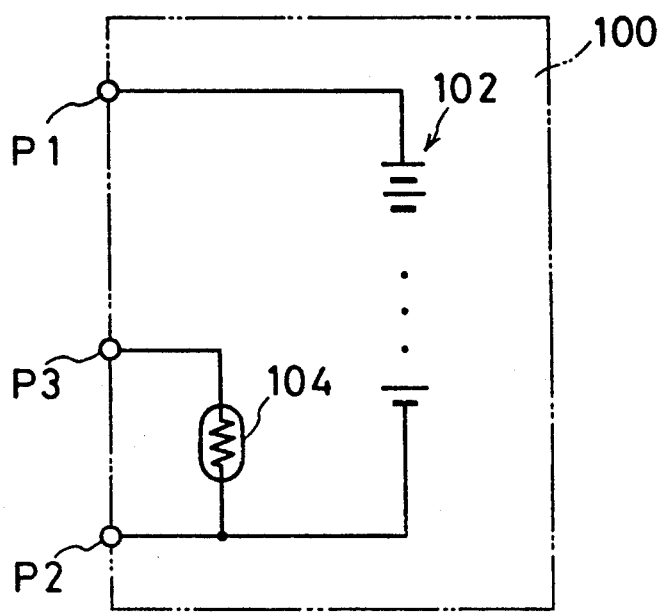
F I G. 4
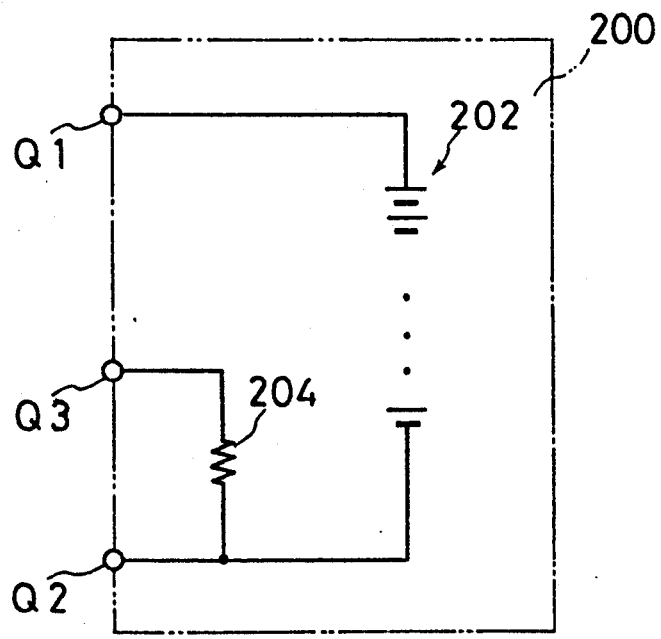

CHARGING APPARATUS

This is a continuation of copending application Ser. No. 07/751,320 filed on Aug. 28, 1991, now abandoned.

BACKGROUND OF THE INVENTION

1. Field of the Invention

The present invention relates to a charging apparatus. More specifically, the present invention relates to a novel charging apparatus which is suitable for a rapid charge of nickel-metal hydride secondary battery (hereinafter, simply called as "Ni-MH battery".

2. Description of Prior Arts

Conventionally, various kinds of systems for rapidly charging a secondary battery have been proposed and put into practical use. A first system is disclosed in, for example, Japanese Patent Laying-Open No. 59-6731 laid-open on Jan. 13, 1984. In the first system, by utilizing a matter that a battery temperature increases with a progress of a charge, the charge is stopped as regarded as a fully charged state when the battery temperature reaches a predetermined value. In the first system, since the battery temperature is easily influenced by an ambient temperature, it is impossible to accurately control the charge.

A second system is a so-called "-ΔV system" which is disclosed in, for example, U.S. Pat. No. 4,354,148 issued on Oct. 12, 1982 or U.S. Pat. No. 4,387,332 issued on Jun. 7, 1983 both of which were assigned to the same assignee as that of the present invention. A battery voltage of a nickel-cadmium (Ni-Cd) battery changes as shown in FIG. 1 with a progress of a charge. Although the battery voltage indicates a peak thereof at a timing X in FIG. 1, the Ni-Cd battery is not fully charged at this timing X and becomes a fully charged state at a timing Y when the battery voltage slightly drops while passing the peak. Therefore, in the second system, the charge is stopped at the timing Y in FIG. 1. The second system is suitable for a Ni-Cd battery. However, in a Ni-MH battery to which the present invention is directed, although a battery voltage changes in a similar manner as that of the Ni-Cd battery, the timing X (FIG. 1) when the battery voltages reaches the peak is a fully charged state. Therefore, if the charge is continued after the battery voltage reaches the peak in accordance with the second system as similar to the Ni-Cd batteries, there is a problem that deterioration due to heat generation according to a chemical reaction inside the Ni-MH battery occurs. Therefore, the second system is not suitable for a charging apparatus of the Ni-MH battery.

A third system is disclosed in UK Patent No. 1,097,451 issued on Jan. 3, 1968. In the third system, an increasing rate of a battery voltage with respect to a time at a fully charged state is measured in advance and, by utilizing the increasing rate obtained through the measurement as a reference, in practically charging, the charge is stopped when the increasing rate of the battery voltage becomes equal to or below the reference value. The third system can be utilized as a charging apparatus for a Ni-MH battery in which the characteristic deterioration due to overcharge becomes a large problem; however, in the third system, there is a disadvantage that flexibility lacks because the above described increasing rate must be practically measured at every timing when a kind of battery, battery capacitance, residual capacitance, charging current (rapid charge or normal charge) or the like is changed.

SUMMARY OF THE INVENTION

Therefore, a principal object of the present invention is to provide a novel charging apparatus.

Another object of the present invention is to provide a charging apparatus which is suitable for a Ni-MH battery.

Another object of the present invention is to provide a charging apparatus in which a Ni-MH battery can be surely made as a fully charged state without troublesome operations.

Another object of the present invention is to provide a charging apparatus in which a Ni-MH battery as well as a Ni-Cd battery can be fully charged.

A charging apparatus in accordance with the present invention comprises power source means for supplying a charging current to a secondary battery; battery voltage value holding means for holding a battery voltage value of the secondary battery; predicted time setting means for setting a predicted time during when the battery voltage of the secondary battery will increase from the battery voltage value held in the battery voltage value holding means by a predetermined voltage; and terminating means for stopping the charging current from being supplied to the secondary battery when the battery voltage of the secondary battery does not increase by the predetermined voltage within the predicted time.

The power source means includes a constant current source, for example, and switching means is turned-on in charging the secondary battery so that the charging current is supplied to the secondary battery. The battery voltage is converted into digital voltage data by an A/D converter and held by the battery voltage value holding means such as a RAM. When the battery voltage does not increase by the predetermined voltage within the predicted time set by the predicted time setting means, it is determined that the battery voltage reaches a peak value, and the terminating means stops supply of the charging current.

In accordance with the present invention, since the charge is stopped when the battery voltage reaches the peak value, it is possible to obtain a charging apparatus which is most suitable for a secondary battery such as a Ni-MH battery which must not be charged after the peak value. In addition, the predicted time is set on the basis of an increasing rate of the battery voltage, there are no troublesomeness as in UK Patent No. 1,097,451, and therefore, a charging apparatus in accordance with the present invention has good flexibility.

In an embodiment, the predicted time setting means sets a new predicted time on the basis of the predicted time previously set and a time which is counted by a timer or the like and required for increasing the battery voltage by the predetermined voltage.

In an embodiment, there is provided with determining means for determining whether supply of the charging current to the secondary battery must be stopped or continued when the battery voltage does not increase by the predetermined voltage within the predicted time and, the terminating means stops the supply of the charging current when the determining means determines that the supply of the charging current is to be stopped. Specifically, the determining means determines continuation or termination of the charge on the basis of a temperature change of the secondary battery. For example, the charge is immediately terminated in response to detection of the peak value of the battery voltage when the Ni-MH battery is charged and, when the Ni-Cd battery is charged, the charge is continued after the battery voltage reaches the peak value until the battery voltage drops by a predetermined voltage. In accordance with this embodiment, it is possible to obtain a fully charged state most suitable for either the Ni-MH battery or Ni-Cd battery.

In addition, if the charging current is stopped when a temperature is detected by a temperature detecting element, it is possible to reduce a temperature detection error due to contact resistance between a terminal of a charging apparatus and a terminal of a battery pack.

The objects and other objects, features, aspects and advantages of the present invention will become more apparent from the following detailed description of the embodiments of the present invention when taken in conjunction with accompanying drawings.

BRIEF DESCRIPTION OF THE DRAWINGS

FIGS. 3 and 4 are circuit diagrams each showing one example of a battery pack.

DETAILED DESCRIPTION OF THE PREFERRED EMBODIMENTS

Figure 2:
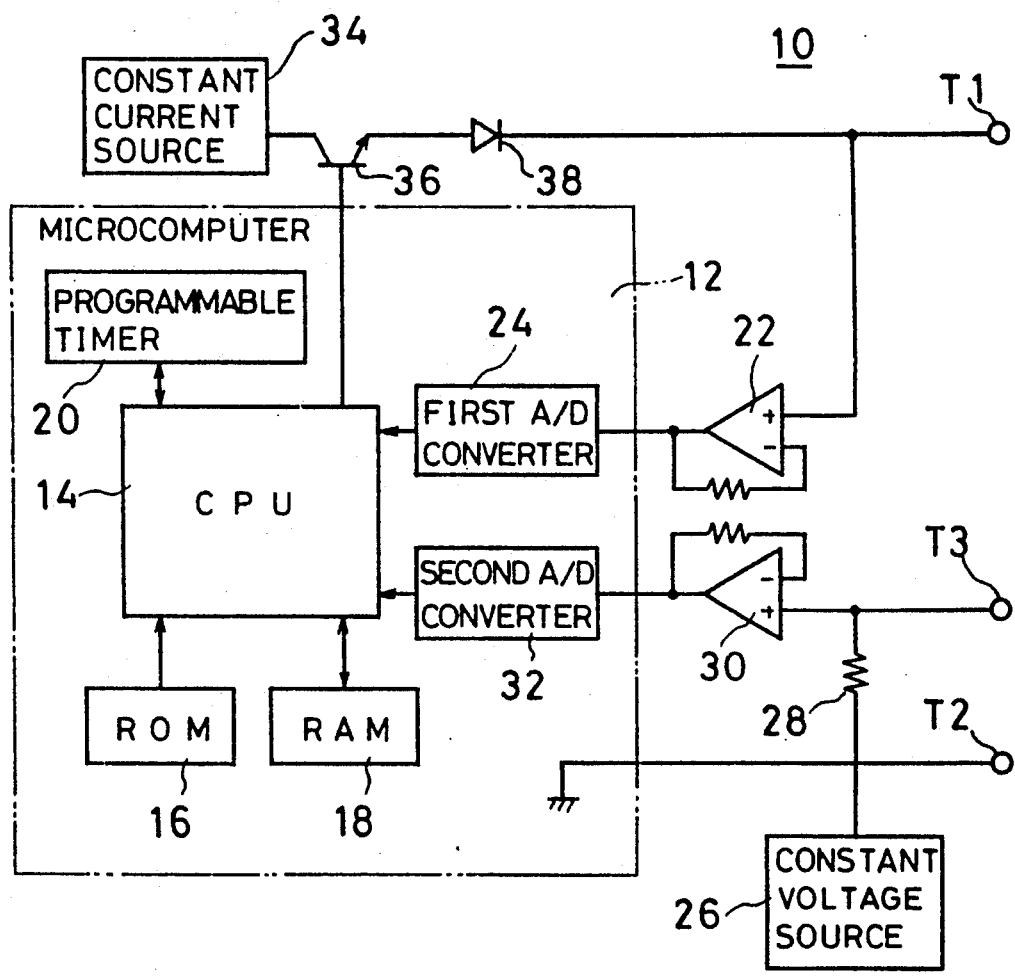
FIG. 2 is a block diagram showing one embodiment in accordance with the present invention.

A charging apparatus 10 shown in FIG. 2 includes terminals T1, T2 and T3 to which terminals P1, P2 and P3 of a battery pack 100 shown in FIG. 3 or terminals Q1, Q2 and Q3 of a battery pack 200 shown in FIG. 4 are connected. The terminal T2 is grounded.

The battery pack 100 shown in FIG. 3 incorporates a Ni-MH battery 102, and a plus or positive electrode of the Ni-MH battery 102 is connected to the terminal P1, and a minus or negative electrode is connected to the terminal T2 which is grounded through the terminal T2. The Ni-MH battery 102 includes a series connection of a plurality of battery cells each having an output voltage of 1.2 V, for example. Then, a temperature detecting element 104 such as a platinum sensor is connected between the terminal P2 and the terminal P3. The temperature detecting element 104 is provided in close to the Ni-MH battery 102, and a resistance value of the temperature detecting element 104 is changed in accordance with a temperature of the Ni-MH battery 102. A temperature range that the temperature detecting element 104 can detect is set as $-20°$ C.$-+80°$ C. for example.

In addition, the battery pack 200 shown in FIG. 4 incorporates a Ni-Cd battery 202, and a plus or positive electrode of the Ni-Cd battery 202 is connected to the terminal Q1 and a minus or negative electrode is connected to a terminal Q2 which is grounded through the terminal T2. The Ni-Cd battery 202 includes a series connection of a plurality of battery cells each having an output voltage of 1.2 V, for example. Then, a resistor 204 is connected between the terminal Q2 and the terminal Q3. A resistance value of the resistor 204 is set as the same as the resistance value of the above described temperature detecting element 104 at an ordinary temperature.

The charging apparatus 10 includes a microcomputer 12 which controls a whole operation of the charging apparatus 10. The microcomputer 12 includes a CPU 14 to which a ROM 16, a RAM 18 and a programmable timer 20 are connected. The ROM 16 stores a control program and the RAM 18 is utilized for temporarily storing variables necessary for an operation of the CPU 14 and etc. The programmable timer 20 may be a decrement counter or an increment counter. In a case of a decrement counter, the programmable timer 20 is decremented from an initial value set by the CPU, and a counted value is applied to the CPU 14. In a case of an increment counter, the programmable timer 20 is initially reset by the CPU 14 to be incremented, and a counted value applied to the CPU 14.

When the battery pack 100 is connected to the charging apparatus 10, the terminals P1, P2 and P3 are respectively connected to the terminal T1, T2 and T3, and therefore, a battery voltage of the Ni-MH battery 102 is applied to an operational amplifier 22 through the terminals P1 and T1, and an output voltage of the operational amplifier 22 is applied to a first A/D converter 24. In addition, an output voltage of a constant voltage source 26 is applied to the terminal T3 through a voltage-dividing resistor 28. Therefore, the voltage of the constant voltage source 26 is divided by the resistance values of the temperature detecting element 104 of the battery pack 100 and the voltage-dividing resistor 28. Since the resistance value of the temperature detecting element 104 is changed in accordance with a temperature of the Ni-MH battery 102, a voltage from the terminals P3 and T1 is also changed in accordance with the temperature of the Ni-MH battery 2. When the temperature of the Ni-MH battery 102 is high, the resistance value of the temperature detecting element 104 is large, and therefore, the voltage from the terminal T3 also becomes large. When the temperature of the Ni-MH battery 102 is low, the resistance value of the temperature detecting element 104 is small, and therefore, the voltage from the terminal T3 also becomes small. The voltage in accordance with the temperature of the Ni-MH battery 102 from the terminal T3 is applied to a second A/D converter 32 through an operational amplifier 30. The first and second A/D converters 24 and 32 respectively convert the voltages from the operational amplifiers 22 and 30 into digital data to apply to the CPU 14.

In addition, when the battery pack 200 is connected to the charging apparatus 10, a battery voltage of the Ni-Cd battery 202 is outputted to the terminal T1, and a constant voltage determined by the voltage-dividing resistor 28 and the resistor 204 is outputted to the terminal T3.

Furthermore, as the microcomputer 12 having the above described structure, a microcomputer chip "M50727" manufactured by Mitsubishi Denki Kabushikigaisha, for example may be utilized.

The charging apparatus 10 further includes a constant current source 34 which generates from a commercial power source (not shown) a DC current (charging current) for charging a secondary battery. The DC current from the constant current source 34 is applied to the aforementioned terminal T1, that is, the terminal P1 of the battery pack 100 or the terminal Q1 of the battery pack 200 through a transistor 36 which functions as a switching element and a diode 38. By controlling turning-on or turning-off of the transistor by the microcomputer 12, supply of a charging current applied from the terminal T1 to the battery pack 100 or 200 can be controlled.

In this embodiment shown, in brief, the microcomputer 12 measures times t1, t2, t3, . . . (FIG. 1) at every timing when the voltage of the terminal T1, that is, the battery voltage of the Ni-MH battery 102 or the Ni-Cd battery 202 is increased by a predetermined value $V_0$, on the basis of the data from the A/D converter 24 and the counted value of the programmable timer 20. On the basis of a measurement result, the microcomputer 12 predicts a time during when the battery voltage will be subsequently increased by the predetermined value $V_0$. Then, the microcomputer 12 determines that the battery voltage of the Ni-MH battery 102 or the Ni-Cd battery 202 reaches a peak thereof shown in FIG. 1 when the battery voltage does not increase by $V_0$ within the predicted time. Thereafter, the microcomputer 12 determines whether the battery pack 100 is connected to the charging apparatus 10 or the battery pack 200 is connected to the same, on the basis of the voltage from the terminal T3, and controls the charging process thereafter.

Figure 1:
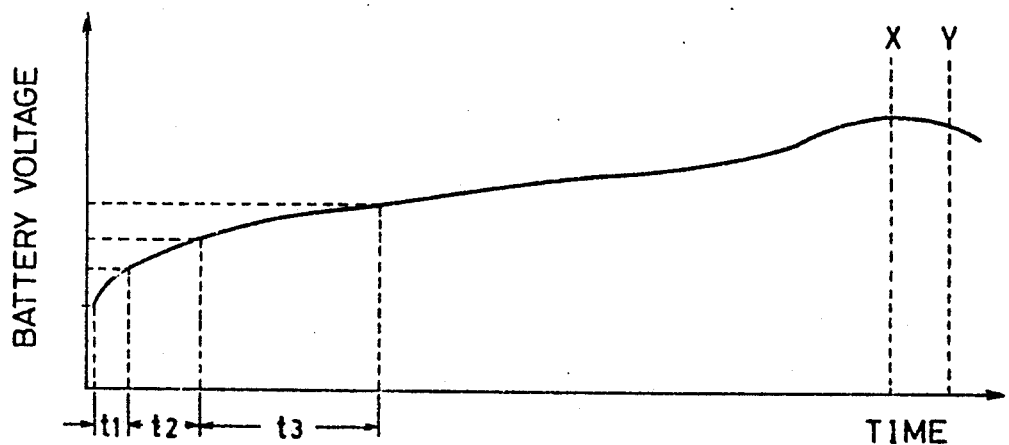
FIG. 1 is a graph showing a typical battery voltage characteristic of a secondary battery with respect to a charging time.

In the following, a detailed operation of the charging apparatus 10 of this embodiment shown will be described in reference to FIGS. 1 and 5. It is to be noted in advance that specific numeral values which occur in the following description are suitable for a case where the Ni-MH battery 102 (FIG. 3) includes a series connection of ten (10) cells each having an output voltage of 1.2 V, and the Ni-Cd battery 202 (FIG. 4) includes a series connection of ten (10) cells each having an output voltage of 1.2 V, and the charging current is 1 A, and therefore, these numeral values have no meanings for limitation.

Figure 5:
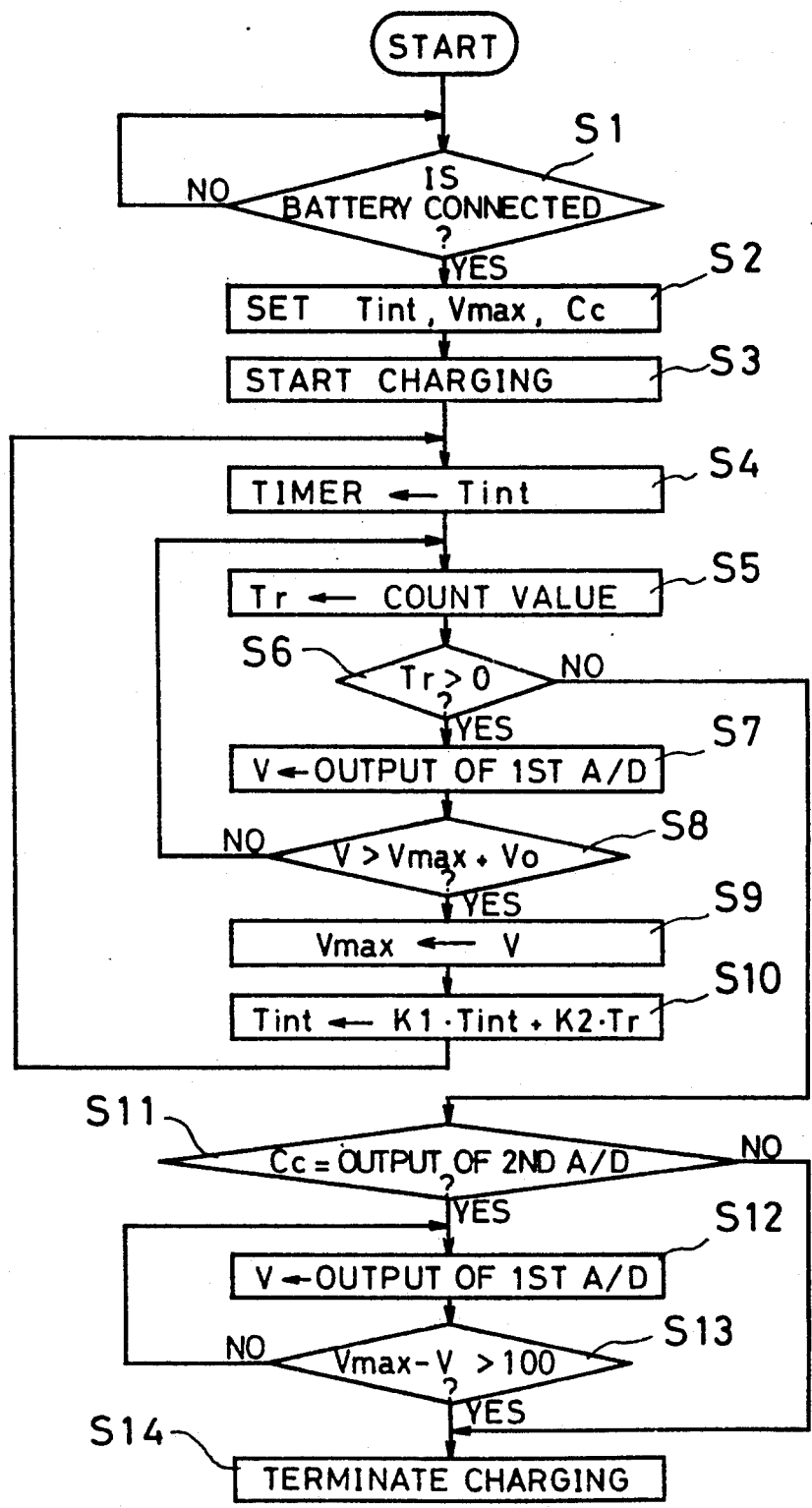
FIG. 5 is a flowchart showing one example of an operation of FIG. 2 embodiment.

In a first step S1 of FIG. 5, the CPU 14 detects whether or not a normal battery pack is connected to the charging apparatus 10. More specifically, when the terminals P1, P2 and P3 of the battery pack 100 or the terminals Q1, Q2 and Q3 of the battery pack 200 are connected to the terminals T1, T2 and T3 of the charging apparatus 10, as described above, a given voltage exists at the terminal T3, and therefore, the CPU 14 detects whether or not the battery pack 100 or 200 is connected to the charging apparatus 10 by detecting whether or not the voltage exists at the terminal T3. Specifically, if the battery pack 100 is connected to the charging apparatus 10, the voltage in accordance with the resistance value of the temperature detecting element 104 which is dependent on the temperature of the Ni-MH battery 102 or an ambient temperature occurs at the terminal T3. When the battery pack 200 is connected to the charging apparatus 10, the voltage in accordance with the resistance value of the resistor 204 occurs at the terminal T3.

In addition, if a short-circuit or snapping of a wire occurs in the battery pack 100 or 200, the resistance value between the terminals P2 and P3 or the terminals Q2 and Q3 becomes zero or infinity. Therefore, the voltage value of the terminal T3 becomes very small or very large. That state is similar to a state where the temperature detecting element 104 detects a lowest temperature or a highest temperature. Therefore, even though a battery pack with failure is connected to the charging apparatus 10, there is possibility that the CPU 14 erroneously determines that a normal battery pack 100 is connected to the charging apparatus 10. Therefore, in this embodiment shown, although the temperature detecting element 104 can detect a temperature within a range of −20° C. −+80° C., when the voltage existing at the terminal T3 is a voltage other than voltages equal to temperatures within a range of −10° C.−+70° C., it is determined that normal battery pack 100 or 200 is not connected to the charging apparatus 10. In this case, the CPU 14 does not make the process proceed to a next step S2.

Then, the CPU 14 executes the step S2 if the CPU 14 detects that normal battery pack 100 or 200 is connected to the charging apparatus 10 in the step S1. In the step S2, respective variables in the RAM 18 (FIG. 2) are initially set. Specifically, the CPU 14 sets a variable $T_{int}$ in a predetermined storage position of the RAM 18. The variable $T_{int}$ is corresponding to the above described predicted time and, in this embodiment shown, "2 minutes" is initially set. In addition, the CPU 14 initially sets data of the voltage value at the terminal T1 outputted from the first A/D converter 22 as a variable $V_{max}$ and data of the voltage value at the terminal T3 outputted from the second A/D converter 32 in a variable $C_c$ as a reference temperature.

Thereafter, the CPU 14 outputs a switching signal to turn the transistor 36 on in a step S3. Therefore, the charging current from the constant current source 34 is applied to the battery pack 100 or 200 through the terminal T1 and the terminal P1 or Q1. The charge is thus started.

Thereafter, the CPU 14 executes steps S4–S10 to detect a peak of the battery voltage. Specifically, in this embodiment shown, the programmable timer 20 is constructed as a decrement counter, and therefore, in the step S4, the CPU 14 sets the variable $T_{int}$ of the RAM 18 into the programmable timer 20. Responsively, the programmable timer 20 is decremented for each clock signal or one second signal while the variable $T_{int}$ is an initial value. The counted values of the programmable timer 20 are successively inputted to the CPU 14. In the step S5, the counted value of the programmable timer 20 is stored in the RAM 18 as a variable $T_r$. In the succeeding step S6, the CPU 14 determines whether or not the variable $T_r$ is larger than "0" ($T_r>0$). If $T_r>0$, in the step S7, the CPU 14 sets data outputted from the first A/D converter 22 in the RAM 18 as a variable V representative of a battery voltage at that time. Then, in a step S8, the CPU 14 determines whether or not a value of the variable V is larger than the variable $V_{max}$ which was previously set by the aforementioned predetermined voltage $V_0$ (for example, 10 mV) or more ($V \geq V_{max}+V_0$). If $V<V_{max}+V_0$, the process returns to the step S5 and, if $V \geq V_{max}+V_0$, in the step S9, the CPU 14 changes the value of the variable $V_{max}$ with the value of the variable V. Thus, the variable $V_{max}$ representative of a maximum battery voltage is changed momentarily.

In the step S10, the CPU 14 calculates a predicted time in accordance with the following equation and sets the same in the RAM 18 as a new predicted time $T_{int}$.

$$T_{int}=K1 \cdot T_{int}+K2\sqrt{(T_{int}-T_r)}$$

where K1 and K2 are arbitrary positive numeral values. Thus, the predicted time during when the battery voltage will be succeedingly increased by the predetermined voltage $V_0$ is changed.

Figure 6:
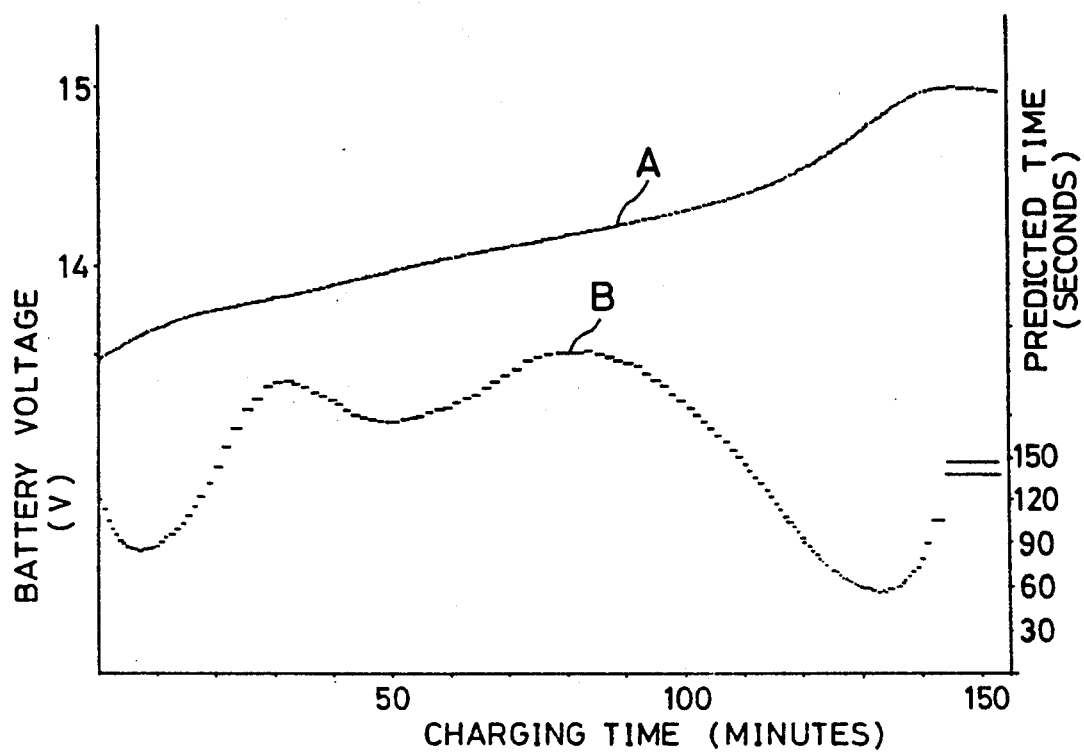
FIGS. 6 and 7 are graphs each showing a battery voltage and a predicted time in accordance with FIG. 5 flowchart.
Figure 7:
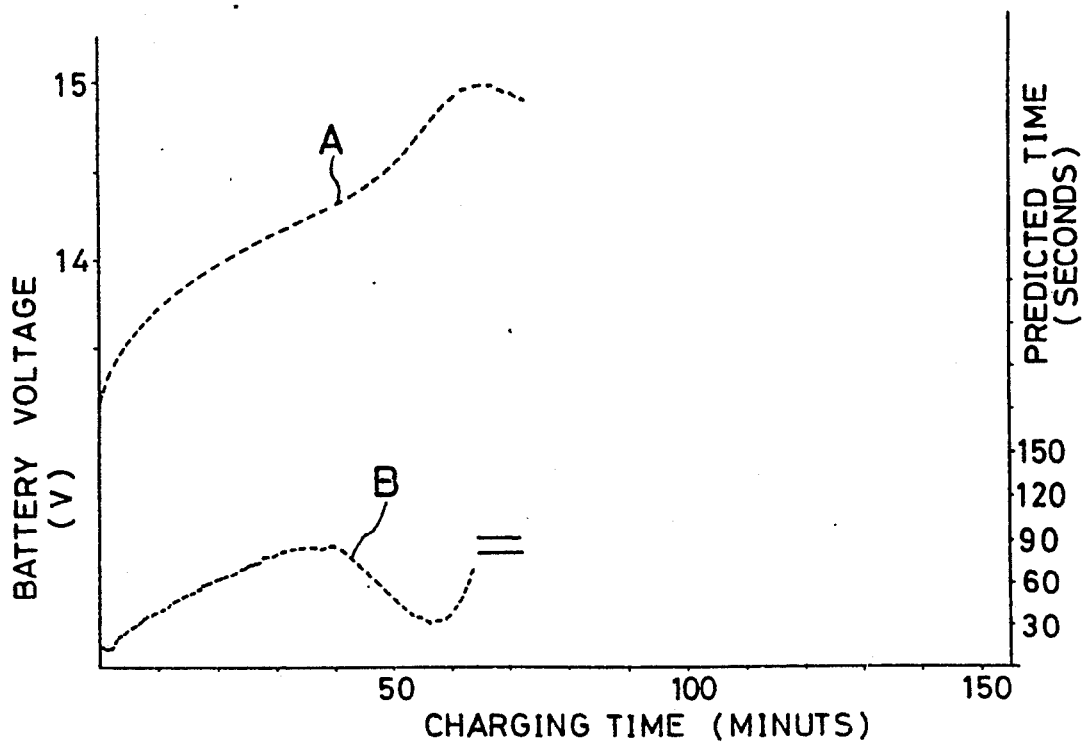

In order to decide the numeral values K1 and K2, the inventors et al. performed various kinds of experimentations. The change of the battery voltage of the Ni-MH battery 102 (line A) and the change of the predicted time $T_{int}$ (line B) in a case of K1=¾ and K2=½ in accordance with results of the experimentations are shown in FIG. 6 and FIG. 7. A graph in FIG. 6 shows a rapid charge when the residual battery capacitance is small and the graph in FIG. 7 showing a rapid charge when the residual capacitance of the battery is large. When K1=¾ and K2=½ are thus set, it is confirmed that no erroneous operation occurs even if the battery voltage is influenced by a noise as far as the experimentations are performed.

Then, the process returns to the previous step S4, the variable $T_{int}$ of a new predicted time which is decided as described above is set in the programmable timer 20 by the CPU 14, and thereafter, the steps S5–S10 are repeatedly executed. Specifically, at every timing when the battery voltage increased by the predetermined voltage $V_0$ within the predicted time set by the variable $T_{int}$ in the step S8, new variables $V_{max}$ and $T_{int}$ set in the steps S9 and S10, respectively. By the experimentation in accordance with this method, it is confirmed that the peak of the battery voltage can be detected with an error range of ±10 mV at maximum.

If it is not detected that the battery voltage was not increased by the predetermined value $V_0$ within the variable $T_{int}$ of the predicted time in the step S8 and if $T_r \leq 0$ was determined in the step S6, the process proceeds to a next step S11. In the step S11, the CPU 14 compares the data outputted from the second A/D converter 32 with the variable $C_c$ of the temperature previously set in the RAM 18 to determine whether or not a difference between the both is within ±2° C. If "No" is determined in the step S11, what is connected to the charging apparatus 10 at that time is the battery pack 100, i.e. the Ni-MH battery 102. In this case, the peak of the battery voltage has been detected, it is not necessary to continue the charge. Therefore, in a step S14, the CPU 14 outputs a switching signal to turn the transistor 36 off. Thus, the charge of the Ni-MH battery 102 is stopped. On the other hand, when the battery pack 200 is connected to the charging apparatus 10, since the resistance value of the resistor 204 is constant and temperature change of the Ni-Cd battery 202 is apparently 1°–2° C. at maximum, the data from the second A/D converter 32 is substantially the same as the variable $C_c$ initially set in the RAM 18. Therefore, "YES" is determined in the step S11. In this case, the Ni-Cd battery 202 is connected to the charging apparatus 10. Therefore, although the peak of the battery voltage has been detected, the charge is further continued to be brought it in a fully charged state. Therefore, the process proceeds to the step S12. In the step S12, the CPU 14 sets the battery voltage outputted from the first A/D converter 22 in the RAM 18 as the variable V. In a next step S13, the CPU determines whether or not the variable V becomes smaller than the variable $V_{max}$ equal to the maximum battery voltage set in the RAM 18 by a predetermined value, for example, 100 mV or more. Then, the steps S12 and S13 are repeatedly executed until $V_{max}-V > 100$ mV is detected.

In addition, the variable $V_{max}$ in the steps S12 and S13 indicates the peak value of the battery voltage stored in the RAM 18 in the steps S4–S10. As described above, the Ni-Cd battery 202 becomes a fully charged state at the timing Y shown in FIG. 1 when the battery voltage drops by the predetermined voltage (100 mV in this embodiment) from the peak value. Therefore, by executing the steps S12 and S13 repeatedly, it is possible to detect the full charge of the Ni-Cd battery 202.

Then, the full charge of the Ni-Cd battery 202 is detected in the step S13, as similar to a time when the full charge of the Ni-MH battery 102 is previously detected, the CPU 14 turns the transistor 36 off to stop the supply of the charging current in the step S14.

Figure 8:
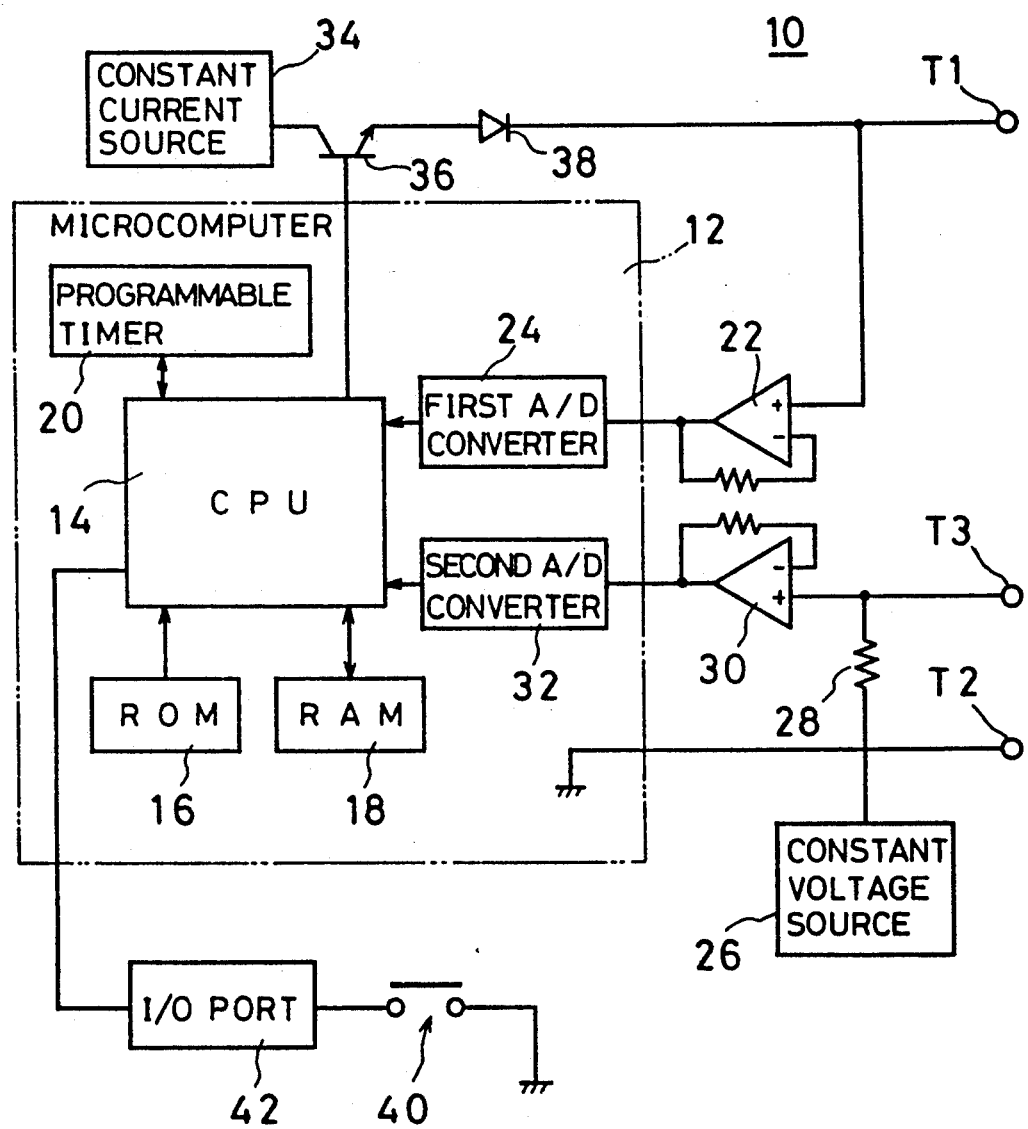
FIG. 8 is a block diagram showing a modified example of FIG. 2 embodiment.
Figure 9:
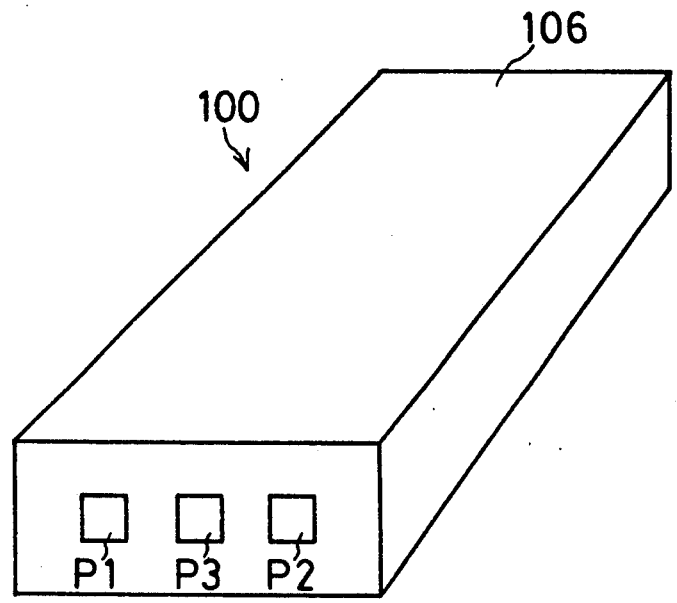
FIGS. 9 and 10 are illustrative views each showing a battery pack applied to FIG. 8 embodiment.

FIG. 8 shows a modified example of the embodiment shown in FIG. 2, in this embodiment shown in FIG. 8, a microswitch 40 is connected to the CPU 14 of the microcomputer 12 through an I/O port 42. The microswitch 40 detects that the battery pack (FIG. 3) is connected to the charging apparatus 10 or that the battery pack 200 (FIG. 4) is connected to the same, in accordance with shape or configuration of battery packs. More specifically, the battery pack 100 used in FIG. 8 embodiment includes a casing 106 which is a rectangular parallelepiped having respective plain surfaces as shown in FIG. 9, and the terminals P1, P2 and P3 shown in FIG. 3 are exposed on a side surface of the casing 106. In addition, the battery pack 200 shown in FIG. 10 also includes a casing 206 of a rectangular parallelepiped, and the terminals Q1, Q2 and Q3 shown in FIG. 4 are exposed on a side surface of the casing 206. A recess portion 208 is formed at a portion of the casing 206, and the microswitch 40 is provided at such a position that an actuator (not shown) of the microswitch 40 can engage with the recess portion 208 when the battery pack 200 is loaded to the charging apparatus 10. It is possible to determine whether what is loaded to the charging apparatus 10 is the battery pack 100 or the battery pack 200 through such cooperation of the configuration of the casing of the battery pack and the microswitch 40. Specifically, when the battery pack 100 is loaded to the charging apparatus 10, the actuator of the microswitch 40 is depressed by the casing 106, and thus, the microswitch 40 is turned-on. In contrast, if the battery pack 200 is loaded to the charging apparatus 10, since the actuator of the microswitch 40 is not depressed by a function of the recess portion 208, the microswitch 40 is kept in its turned-off state. Therefore, the CPU 14 identifies the battery pack 100 or the battery pack 200 on the basis of a high level or a low level of an output from the I/O port 42.

Figure 10:
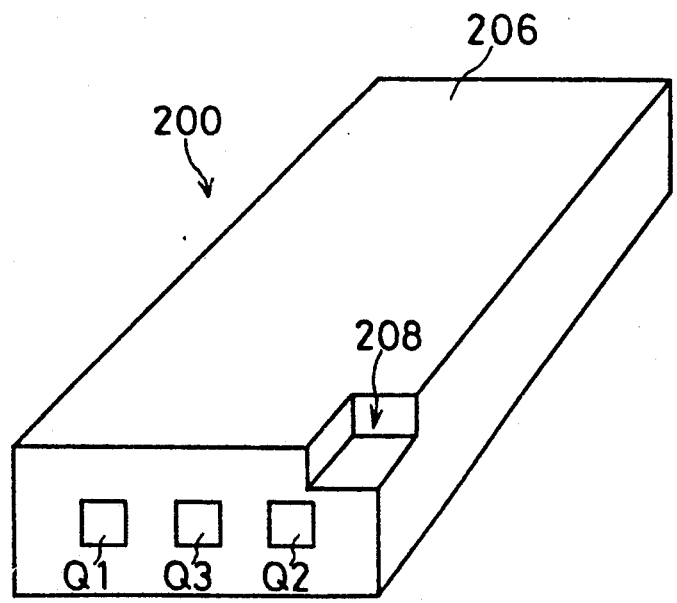

The embodiment shown in FIGS. 8–10 performs the same function as that of the step S11 of the embodiment shown in FIG. 5. More specifically, in the previous embodiment, the battery pack 100 or 200 is identified in accordance with the voltage at the terminal T3, that is, the temperature thereof and, if the battery pack 100 is loaded to the charging apparatus 10, the process proceeds from the step S11 to the step S14 and, when the battery pack 200 is loaded, the process proceeds from the step S11 to the steps S12 and S13. In the embodiment shown by FIGS. 8–10, when the CPU 14 detects the output from the I/O port 42 of the low level, the process proceeds to the step S14 and, when the output of the high level is detected, the process proceeds to the steps S12 and S13.

In addition, in FIG. 8 embodiment, since the kind of battery pack is determined on the basis of the configuration thereof, the terminal T3 of the charging apparatus 10, constant voltage source 26, voltage-dividing resistor 28, operational amplifier 30 and the second A/D converter 32 may be omitted.

The cooperation of the microswitch and the configuration of the battery pack in the embodiment shown by FIGS. 8-10 may be replaced with other arbitrary method wherein difference of the battery pack can be mechanically detected. For example, the battery pack 100 and 200 may be provided with reflection sheets or throughholes at positions different from each other in accordance with the battery pack 100 or 200, and the charging apparatus 10 may be provided with a photosensor which is arranged at a position that any one of the reflection sheets and the throughholes can be detected, and an output of the photosensor may be applied to the CPU 14. Furthermore, a combination of a reed switch and a magnet may be utilized.

Figure 11:
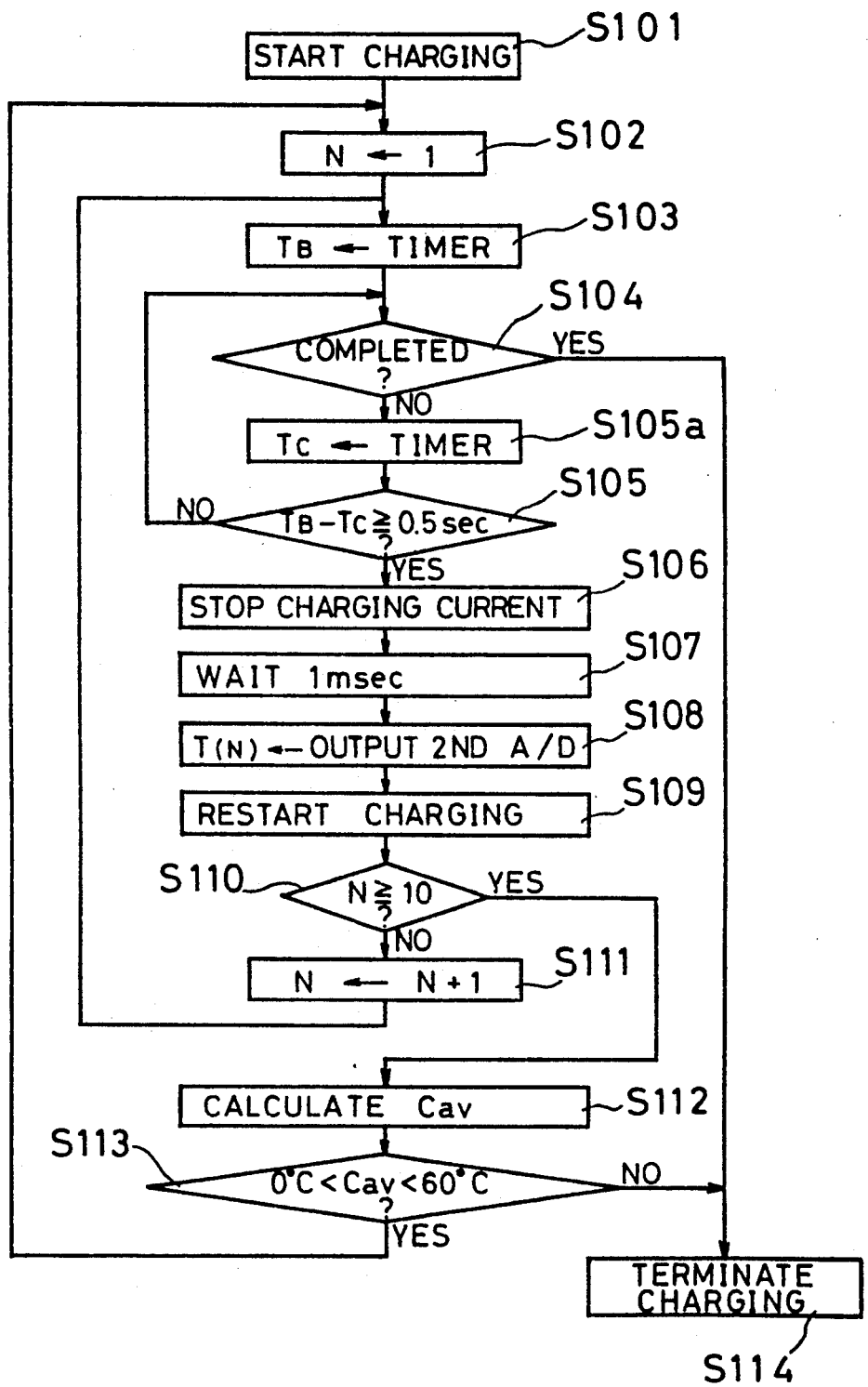
FIG. 11 is a flowchart showing a modified example of an operation shown in FIG. 5 of FIG. 2 embodiment.

Next, with reference to FIG. 11, a modified example of the embodiment shown in FIG. 5 will be described. In FIG. 11 embodiment, after execution of the steps S1 and S2 in FIG. 5, in a step S101, the transistor 36 is turned-on by the CPU 14 of the microcomputer 12 so that the supply of the charging current from the constant current source 34 to the battery pack 100 or 200 is started. In a next step S102, the CPU 14 sets "1" in a variable N at a predetermined storage position of the RAM 18 and, in a step S103, the CPU 14 reads the counted value $T_B$ of the programmable timer 20. In this case, the programmable timer 20 is constructed as a decrement timer as similar to the previous FIG. 5 embodiment. In addition, the variable N, will be apparent from the following description, indicates the number of times that the CPU 14 reads the output of the second A/D converter 32.

In a step S104, the CPU 14 determines whether or not the charge is completed. That is, in the step S104, the steps S4–S13 shown in FIG. 5 are executed, and it is determined whether or not the charge of the Ni-MH battery 102 or the Ni-Cd battery 202 is completed. However, a duplicate description will be omitted here. Then, in a case where the charge is completed, as similar to the previous step S14, in a step S104a, the CPU 14 turns the transistor 36 off to stop the supply of the charging current.

If it is determined that the charge has not been completed in the step S104, in the step S105a, the CPU 14 reads again a counted value $T_C$ of the programmable timer 20. Thereafter, in a step S105, the CPU 14 determines whether or not a difference between the counted value $T_B$ read in the step S103 and the counted value $T_C$ read in the step S105a is more than 0.5 seconds. When a counted time by the programmable timer 20 does not reach 0.5 seconds, the process returns to the step S104 and, when 0.5 seconds lapse, the process proceeds to a step S106.

In the step S106, the transistor 36 is turned-off by the CPU 14, and therefore, the supply of the charging current is stopped. Then, in a succeeding step S107, it is detected that 1 millisecond lapses and, in a step S108, the CPU 14 sets the temperature data detected by the temperature detecting element 104 (FIG. 3) in the RAM 18 as a variable $C_N$ on the basis of the output of the second A/D converter 32. Thereafter, in a step S109, the CPU 14 turns the transistor 36 on to restart the supply of the charging current.

Then, in a step S110, it is determined whether or not the value of the variable N set in the step S102 reaches "10". If "NO" is determined in the step S110, the variable N is incremented in a step S111, and the process returns to the step S103. If "YES" is determined in the step S110, in a step S112, the CPU 14 calculates an average temperature $C_{av}$. More specifically, when the process proceeds to the step S112, the step S108 is executed ten (10) times, and therefore, temperature data $C_1$, $C_2$, ..., $C_{10}$ have been stored in the RAM 18. In the step S112, the CPU 14 calculates the average value $C_{av}$ of the temperature data $C_1$, $C_2$, ..., $C_{10}$. Then, in a step S113, the CPU 14 determines whether or not the average temperature $C_{av}$ as calculated is in a range of 0° C.–60° C. (0° C. $< C_{av} <$ 60° C.). If "YES" is determined in the step S113, the process returns to the previous step S102, the CPU 14 interrupts the supply of the charging current in a step S104a to terminate the charge. A reason is that since the average temperature $C_{av}$ is high, if the charge is further continued, the characteristic deterioration of the Ni-MH battery 102 or the Ni-Cd battery 202 occurs.

In accordance with FIG. 11 embodiment, when the CPU 14 reads the voltage generated by the temperature detecting element 104 (FIG. 3) or the resistor 204 (FIG. 4), the supply of the charging current to the Ni-MH battery 102 or the Ni-Cd battery 202 is stopped. Therefore, even if the contact resistance occurs between the terminal P2 of the battery pack or the terminal Q2 of the battery pack 200 and the terminal T2 of the charging apparatus 10, no detection error occurs.

In a case where the charging current 1 A, the voltage-dividing resistor 28 is 1 k$\Omega$, a thin film platinum temperature sensor "TO-370" manufactured by Matsushita Electronic Industry Co., Ltd. is used as the temperature detecting element 104, the contact resistance between the terminal T1 and the terminal P1 or Q2 is 30 m$\Omega$, a permitted current of the temperature detecting element 104 is 10 mA, and the resistance values are 920 $\Omega$, 1000 $\Omega$ and 1213 $\Omega$ at $-20°$ C., 0° C. and 60° C., respectively, when the temperature of the battery pack 100 or 200 is 0° C. and the charging current is supplied thereto, since a voltage of 30 mV ($= 1$ A$\times$30 m$\Omega$) exists at the terminal T2, the voltage at the terminal T3 becomes 2.515 V. The voltage value is theoretically the same as a voltage value at a timing when a detected temperature by the temperature detecting element 104 is approximately 3.4° C., and therefore, the detection error of 3.4° C. occurs due to the contact resistance of 30 m$\Omega$.

On the other hand, when the temperature of the battery pack 100 or 200 is 0° C. and the supply of the charging current is stopped, the voltage at the terminal T3 becomes approximately 2.50004 V. The voltage value is theoretically the same as a voltage value at a timing when the detected temperature by the temperature detecting element 104 is approximately 0.009° C. Therefore, if the supply of the charging current is stopped when the temperature is to be detected in accordance with FIG. 11 embodiment, it is possible to drastically increase the accuracy of the temperature detection.

In addition, in FIG. 11 embodiment, a waiting time of 1 millisecond is set in a step S107 in order to secure a time during when no influence of the charging current with respect to the terminal T2 occurs after stopping the charge in the step S106.

Furthermore, in FIG. 11 embodiment, it is determined whether or not the charge is to be continued on the basis of the average temperature by calculating the average temperature (step S113); however, by detecting the temperature at every few seconds to few ten seconds, determination similar to the step S113 may be performed at every timing when the temperature is detected. In this case, there is possibility that detection error occurs due to a noise. In addition, it is possible to arbitrary set a time interval and the number of detection times for detecting the temperature and calculating the average temperature.

In FIG. 11 embodiment, it may be felt that the charge time becomes long because the supply of the charging current is stopped during the temperature detection period; however, this stopping time is approximately 1 millisecond at every approximately 0.5 seconds, and thus, it is possible to ignore almost. For example, in a case where the charge is continuously performed in FIG. 5 embodiment and thus the charging time of 2.5 hours is required, an additional charging time required for FIG. 11 embodiment is only 18 seconds approximately.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A charging apparatus, comprising:
   power source means for supplying a charging current to a secondary battery;
   battery voltage value holding means for holding a battery voltage value of said secondary battery;
   predicted time setting means for setting a predicted time during which the battery voltage of the secondary battery to be charged will increase by a predetermined voltage and for continually adjusting the predicted time on the basis of the battery voltage value previously held in said battery voltage value holding means; and
   terminating means for stopping said charging current from being supplied to said secondary battery when the battery voltage of said secondary battery is not increased by said predetermined voltage within said predicted time.

2. A charging apparatus in accordance with claim 1, further comprising renewing means for renewing said battery voltage value holding means with the battery voltage of said secondary battery at a timing when said battery voltage of said secondary battery is increased by said predetermined voltage within said predicted time.

3. A charging apparatus in accordance with claim 2, further comprising timer means for counting a time required for increasing said battery voltage of said secondary battery by said predetermined voltage, wherein said predicted time setting means includes means for setting a new predicted time on the basis of at least one of the predicted time that is previously set and said time counted by said timer means.

4. A charging apparatus, comprising:
   power source means for supplying a charging current to a secondary battery;
   kind determinating means for determining a kind of said secondary battery;
   battery voltage value holding means for holding a battery voltage value of said secondary battery;
   predicted time setting means for setting a predicted time during which the battery voltage of the secondary battery to be charged will increase by a predetermined voltage and for continually adjusting the predicted time on the basis of the battery voltage value previously held in said battery voltage value holding means;
   determining means for determining whether or not the battery voltage of said secondary battery increased by said predetermined voltage within said predicted time; and
   control means for controlling whether or not supply of said charging current is continued in accordance with determination by said kind determinating means when it is detected by said determining means that said battery voltage did not increase by said predetermined voltage within said predicted time.

5. A charging apparatus in accordance with claim 4, further comprising a resistance element provided in association with said secondary battery, wherein said kind determining means includes resistance change detecting means for determining a kind of said secondary battery on the basis of change of a resistance value of said resistance element.

6. A charging apparatus in accordance with claim 4, wherein said secondary battery is contained in a casing having a predetermined configuration, and said kind determining means includes configuration detection means for determining a kind of said secondary battery on the basis of a configuration of said casing.

7. A charging apparatus in accordance with claim 4, wherein said secondary battery is contained in a casing, and a mark which is mechanically readable is applied to said case, and said kind determining means includes mark detection means for detecting said mark.

8. A charging apparatus in accordance with claim 5, wherein said resistance element includes a temperature dependent resistance element thermally coupled to said secondary battery, said temperature dependent resistance element is connected to divide a voltage from a voltage source, and said resistance change detecting means includes voltage level detecting means for detecting a voltage level as divided by said temperature dependent resistance element.

9. A charging apparatus in accordance with claim 8, further comprising current stopping means for stopping supply of said charging current when said voltage level detecting means detects said voltage level.

10. A charging method, comprising steps of:
    (a) holding a battery voltage of a secondary battery,
    (b) setting a predicted time during which the battery voltage of the secondary battery to be charged will increase by a predetermined voltage and continually adjusting the predicted time on the basis of the battery voltage previously held in the step (a), and
    (c) stopping supply of a charging current to said secondary battery when the battery voltage of said secondary battery did not increase by said predetermined voltage within said predicted time.

11. A charging method in accordance with claim 10, further comprising a step of (d) setting a new predicted time when said battery voltage of said secondary battery is increased by said predetermined voltage within said predicted time.

12. A charging method comprising steps of:
    (a) loading a secondary battery to a charging apparatus so that a charging current is supplied to said secondary battery,
    (b) determining a kind of the secondary battery that is loaded to said charging apparatus, (c) holding a battery voltage value of said secondary battery, (d) setting a predicted time during which the battery voltage of the secondary battery to be charged will increase by a predetermined voltage and continually adjusting the predicted time on the basis of the battery voltage previously held in the step (c), (e) determining whether or not the battery voltage of said secondary battery increased by said predetermined voltage within said predicted time, and (f) determining whether or not supply of said charging current is to be continued in accordance with the kind of said secondary battery when it is determined that said battery voltage did not increase by said predetermined voltage within said predicted time in the step (e).

13. A charging apparatus, comprising:

power source means for supplying a charging current to a secondary battery;

predicted time setting means for setting a predicted time and for continually adjusting the predicted time according to a previously selected predicted time and a time during which the battery voltage of said secondary battery previously increased by a predetermined voltage at every timing when the battery voltage of said secondary battery increases by a predetermined voltage;

determining means for determining whether or not said battery voltage increased by said predetermined voltage within said predicted time; and terminating means for stopping said charging current from being supplied to said secondary battery when it is determined by said determining means that said battery voltage did not increase by said predetermined voltage within said predicted time.

14. A charging apparatus for charging a secondary battery having a charging characteristic wherein a charge is to be stopped when a battery voltage reaches a peak value, comprising:

power source means for supplying a charging current to a secondary battery;

battery voltage value holding means for holding a battery voltage value of said secondary battery;

predicted time setting means for setting a predicted time during which the battery voltage of the secondary battery to be charged will increase by a predetermined voltage and for continually adjusting the predicted time on the basis of the battery voltage value previously held in said battery voltage value holding means;

determining means for determining whether or not the battery voltage of said secondary battery increased by said predetermined voltage within said predicted time; and terminating means for stopping said charging current from being supplied to said secondary battery in response to determination that the battery voltage of said secondary battery did not increase by said predetermined voltage within said predicted time.

15. A charging apparatus for charging a first kind secondary battery having a charging characteristic wherein a charge is to be stopped when a battery voltage reaches a peak value or a second kind of secondary battery having a charging characteristic wherein a charge may be continued after a battery voltage reaches a peak value, comprising:

power source means for supplying a charging current to a secondary battery;

kind determinating means for determining whether the secondary battery is said first kind secondary battery or said second kind secondary battery;

battery voltage value holding means for holding the battery voltage value of said secondary battery;

predicted time setting means for setting a predicted time during which the battery voltage of said secondary battery will increase by a predetermined voltage and for continually adjusting the predicted time on the basis of the battery voltage previously held in said battery voltage value holding means;

determining means for determining whether or not the battery voltage of said secondary battery increased by said predetermined voltage within said predicted time; and control means for controlling whether or not supply of said charging current is continued in accordance with determination by said kind determinating means when it is detected by said determining means that said battery voltage did not increase by said predetermined voltage within said predicted time.

16. A charging method for charging a secondary battery having a charging characteristic wherein a charge is to be stopped when a battery voltage reaches a peak value, comprising steps of:

(a) holding a battery voltage of a secondary battery, (b) setting a predicted time during which the battery voltage of said secondary battery will increase by a predetermined voltage and for continually adjusting the predicted time on the basis of the battery voltage value previously held by said step (a), and (c) stopping supply of a charging current to said secondary battery when the battery voltage of said secondary battery did not increase by said predetermined voltage within said predicted time.

17. A charging method for charging a first kind secondary battery having a charging characteristic wherein a charge is to be stopped when a battery voltage reaches a peak value or a second kind secondary battery having a charging characteristic wherein a charge is to be continued after a battery voltage reaches a peak value, comprising steps of:

(a) loading a secondary battery to a charging apparatus so that a charging current is supplied to said secondary battery, (b) determining whether the secondary battery loaded to said charging apparatus is the first kind secondary battery or the second kind secondary battery, (c) holding a battery voltage value of said secondary battery, (d) setting a predicted time during which the battery voltage of the secondary battery to be charged will increase by a predetermined voltage and continually adjusting the predicted time on the basis of the battery voltage previously held in the step (c), (e) determining whether or not the battery voltage of said secondary battery increased by said predetermined voltage within said predicted time, and (f) determining whether or not supply of said charging current is to be continued in accordance with the kind of said secondary battery when it is determined in the step (e) that said battery voltage did not increase by said predetermined voltage within said predicted time.

* * * * *